W. C. P. BALDWIN.
CUFF.
APPLICATION FILED FEB. 13, 1913.
1,120,666.
Patented Dec. 15, 1914.
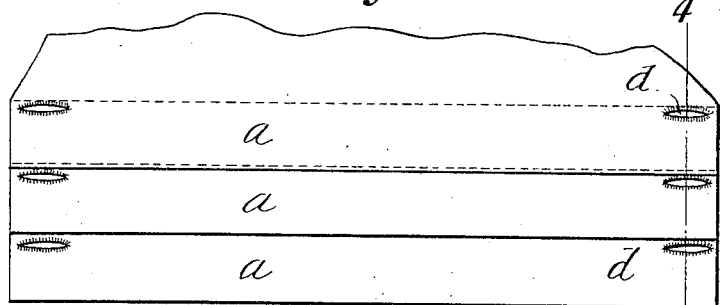
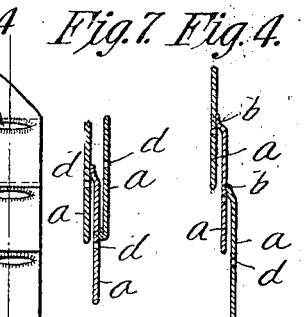
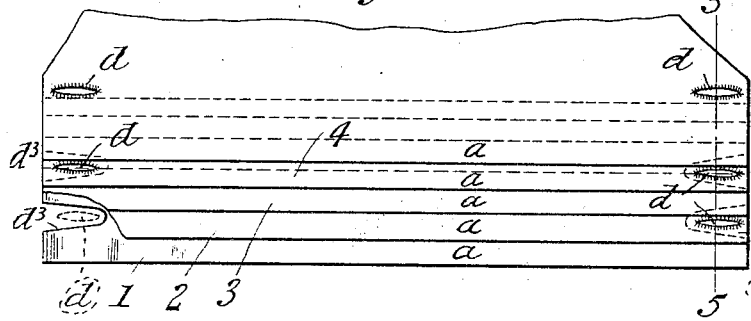
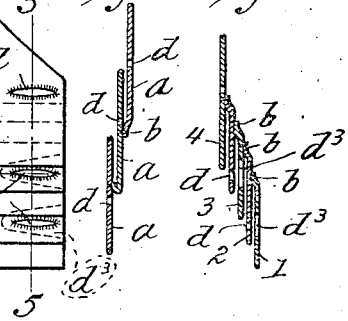
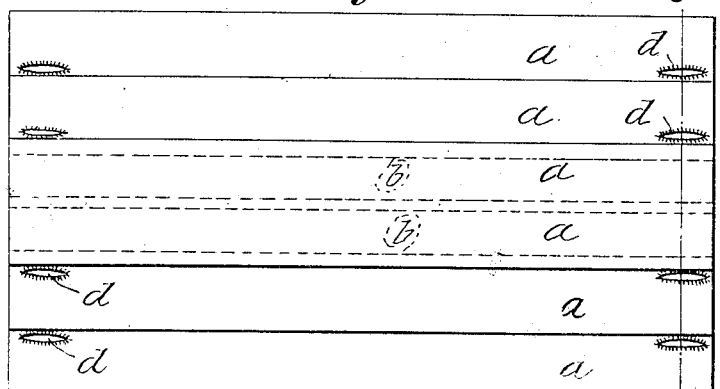
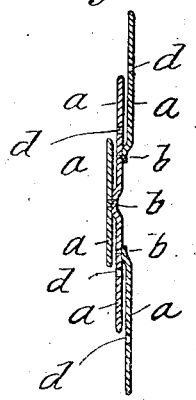
WITNESSES:
H. L. Sprague
W. P. Noble
INVENTOR,
Wm. C. P. Baldwin,
BY
ATTORNEY.

UNITED STATES PATENT OFFICE.

WILLIAM C. P. BALDWIN, OF HOLYOKE, MASSACHUSETTS.

CUFF.

1,120,666.

Specification of Letters Patent.

Patented Dec. 15, 1914.

Application filed February 13, 1913. Serial No. 748,243.

*To all whom it may concern:*

Be it known that I, WILLIAM C. P. BALDWIN, a citizen of the United States of America, and resident of Holyoke, in the county of Hampden and State of Massachusetts, have invented certain new and useful Improvements in Cuffs, of which the following is a full, clear, and exact description.

This invention relates to an improved cuff for a shirt to be provided either as attached to the shirt or detachable therefrom.

The cuff comprises a plurality of leaves arranged in overlapping relations with free edges thereof extended outwardly beyond the relatively adjacent leaves so that when an outermost leaf becomes soiled or worn it may be folded inwardly, leaving the unsoiled or unworn leaf next thereto to serve as the outer edge portion of the cuff.

The invention is described in conjunction with the accompanying drawings and is set forth in the claim.

In the drawings:—Figures 1, 2, and 3 represent face views of cuffs in which my invention is comprised, but of different styles. Figs. 4, 5 and 6 are sectional views on lines 4—4, 5—5 and 6—6. Figs. 7 and 8 are sectional views of the cuff shown in Figs. 1 and 4, showing in the one case one of the leaves inwardly and reversely turned and in the second case two of the leaves inwardly and reversely turned.

The cuff comprises a plurality of leaves $a$, inner portions of which are secured, as by stitching indicated at $b$ to intermediate portions of leaves next thereto, such leaves having their outer portions free and extended edgewise beyond the leaves adjacent thereto and to which they are secured or connected. Several of the leaves are provided with buttonholes $d$ in their outer portions near the cuff ends.

As represented in Figs. 2 and 5, openings or recesses $d^3$ are provided in the inner portions of the leaves which are overlaid by adjacent buttonhole provided leaves, which openings extend to the ends of the cuff.

Assuming that the cuff is worn in the usual manner, held in its wrist encircling form by cuff buttons engaged through the outermost buttonholes, after the forward edge portion of the cuff shall have become soiled, the buttons or links are detached, the soiled portion is folded inwardly upon the under side of the cuff, leaving the unsoiled or less soiled next leaf as the exposed edge portion of the cuff. And by having several leaves comprised in the cuff and arranged and connected as described, they may be successively inwardly folded from time to time as occasion may render desirable to leave the least soiled or unsoiled cuff portions exposed.

In the use of the cuff made as represented in Fig. 2, in which the openings $d^3$ in leaf-overlapped parts open at the ends of the cuff, it is seen that the cuff button will engage through the buttonholes of leaf No. 2 and pass through the opening in leaf No. 1 which is overlaid by the buttonhole provided portion of leaf No. 2. When it is desired to inwardly fold leaf No. 1, it is not necessary to detach the cuff button, as such infolding is not obstructed by the shank of the cuff button or link owing to the provision of the endwise opening recesses $d^3$. When leaf No. 2 is to be inwardly folded, the cuff button will necessarily be removed and carried to engagement through the buttonholes of leaf No. 4, the buttonhole provided portions of which overlie the recessed portions of leaf No. 3; so leaf No. 3 may be inwardly folded as was leaf No. 1 without the necessity of the removal of the cuff button.

I claim:—

A cuff comprising a plurality of leaves, inner portions of which are secured to intermediate portions of leaves next thereto, and such leaves having their outer portions free and extended edgewise beyond the adjacent leaves to which they are secured, several of the leaves being provided with button holes in their outer portions near the cuff ends, and the leaves next inwardly relatively to the so provided leaves having openings in their leaf-overlapped portions which are extended to, and open at, the ends of the cuff.

Signed by me at Springfield, Mass., in presence of two subscribing witnesses.

WILLIAM C. P. BALDWIN.

Witnesses:
G. R. DRISCOLL,
WM. S. BELLOWS.